United States Patent [19]

Sullivan et al.

[11] 4,435,562

[45] Mar. 6, 1984

[54] PROCESS FOR THE PRODUCTION OF POLYESTER COPOLYMERS

[75] Inventors: Carl M. Sullivan; Mellis M. Kelley, both of Akron, Ohio

[73] Assignee: The Goodyear Tire & Rubber Company, Akron, Ohio

[21] Appl. No.: 492,109

[22] Filed: May 6, 1983

[51] Int. Cl.$^3$ .............................................. C08G 63/22
[52] U.S. Cl. .................................... 528/272; 528/275; 528/279; 528/283; 528/284; 528/285; 528/308.3
[58] Field of Search .............. 528/272, 275, 279, 283, 528/284, 285, 308.3

[56] References Cited

U.S. PATENT DOCUMENTS

| | | | |
|---|---|---|---|
| 3,654,233 | 4/1972 | Kosel et al. | 528/275 X |
| 3,988,301 | 10/1974 | Jeurissen et al. | 528/283 X |
| 4,039,515 | 8/1977 | Rebhan et al. | 528/275 |
| 4,046,739 | 9/1977 | Lacona | 528/272 |
| 4,208,527 | 6/1980 | Horlbeck et al. | 528/279 |
| 4,223,124 | 9/1980 | Broughton et al. | 528/283 X |

*Primary Examiner*—Lucille M. Phynes
*Attorney, Agent, or Firm*—Alvin T. Rockhill

[57] ABSTRACT

The invention is a process for esterifying organic dicarboxylic acid and diol at elevated temperatures and thereafter transesterifying the esterification product in the presence of a diol and a diester at elevated temperatures thereafter polymerizing the transesterification product in a condensation stage to form a polycondensed copolyester having an intrinsic viscosity from 0.2 to 0.9.

7 Claims, 1 Drawing Figure

FIGURE I. COMPARISON OF INVENTION VS CONTROL
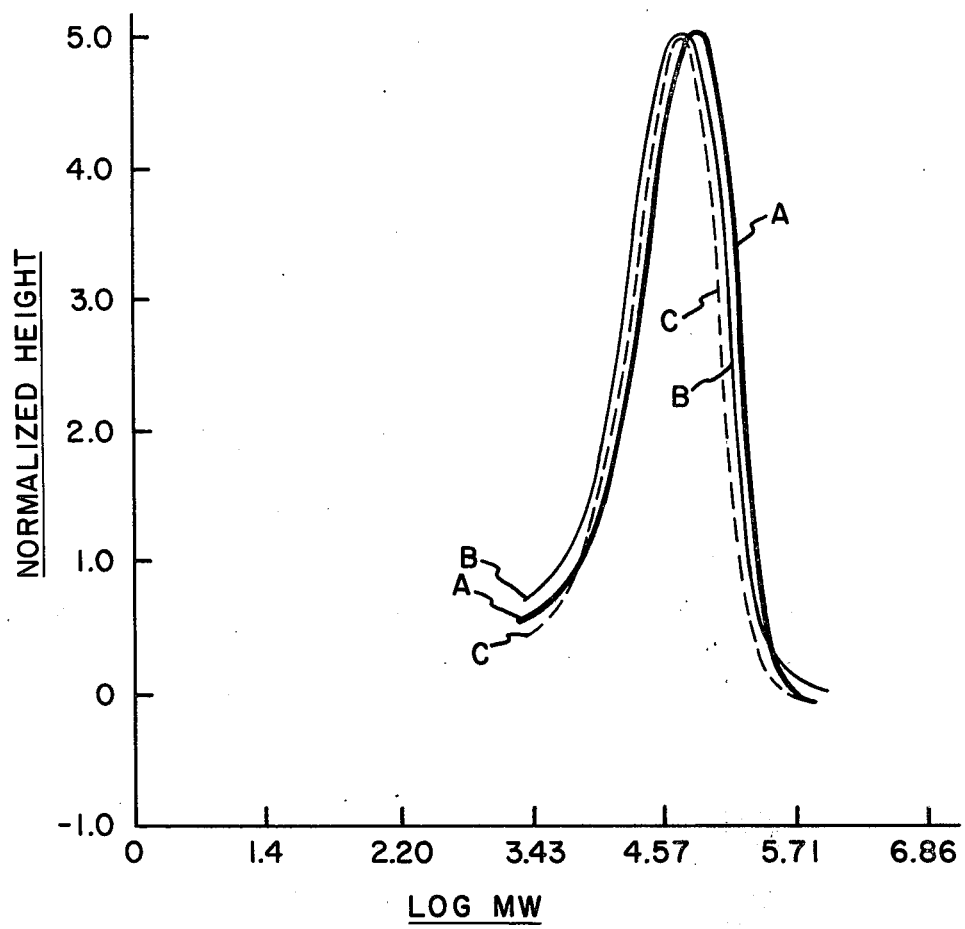
A— PRESENT INVENTION
B— CONTROL B
C— CONTROL C

PROCESS FOR THE PRODUCTION OF POLYESTER COPOLYMERS

BACKGROUND

This invention relates to a new process for the production of copolyester resin. The invention further relates to a process whereby one produces a copolyester with improved randomization.

There are presently two process routes utilized in the production of copolyester resins. The first is classified as the direct esterification (TPA) process. This process allows a copolyester to be produced when glycols are selected that do not dehydrate under acid conditions. As known to those skilled in the art, the polyester is generally made in two stages. In the first stage or esterification stage, the diacid is reacted with the diol at elevated temperatures and pressures with water being produced. In the second stage or the polycondensation stage, a vacuum is gradually applied, generally a catalyst is utilized, and water and excess diol are withdrawn as a condensation product. The second process is classified as the ester interchange (DMT) process. This process allows a copolyester to be produced when glycols are selected that do dehydrate under acid conditions. As known to those skilled in the art, the polyester is made in two stages. In the first stage or transesterification stage, a dimethyl ester is reacted with a diol at elevated temperatures with an alcohol being produced. In the second stage or polycondensation stage, a vacuum is gradually applied, generally a catalyst is utilized and excess diols are withdrawn as a condensation product.

SUMMARY OF THE INVENTION

There is disclosed a process to improve randomization of copolyesters comprising esterifying dicarboxylic acid and diol, said dicarboxylic acid selected from the group comprising alkyl dicarboxylic acids having a total of 2 to 16 carbon atoms and aryl dicarboxylic acids having a total of from 8 to 16 carbon atoms, said diol having from 2 to 10 carbon atoms, said diol is in a mole ratio to dicarboxylic acid from 2.5:1 to 1:15:1 thereafter transesterifying the esterification product in the presence of a diol and a diester, said diol having from 2 to 10 carbon atoms, said diester being selected from the group of alkyl diesters having a total of from 2 to 20 carbon atoms, and alkyl substituted aryl diesters having a total of from 10 to 20 carbon atoms, thereafter polymerizing the transesterification product in a condensation stage to form a polycondensed copolyester having an intrinsic viscosity from 0.2 to 0.9.

BRIEF DESCRIPTION OF THE DRAWING

FIG. 1 is a graph showing results from a gel permation chromatograph analysis based on a polystyrene standard.

DETAILED DESCRIPTION

According to the concepts of the present invention, copolyester resins are produced which are highly effective as adhesives for preparing laminates which can be applied as a hot melt or from solution. The resins produced via the process of the present invention have unexpected advantages over those produced by the conventional methods. Some of these advantages are evidenced by narrower molecular weight distributions and reduction in density variation which confirms a more random system resulting in a more uniform polymer. The inventor has found by using the process of the present invention, the amount of cyclic monomers found in the copolyesters is reduced when compared to those copolyesters produced in the conventional manner.

The present method allows more insoluble monomers for example isophthalic acid to become fully reacted thus increasing the random distribution of these monomers in the polymer matrix. Accordingly, a more favorable molecular weight distribution and solution characteristics as well as a reduction in density variation is achieved.

This invention relates to a new process for the production of copolyester resin. This invention further relates to a process whereby one produces a copolyester with improved randomization.

The dicarboxylic acid that is to be reacted in the esterification stage is selected from the group comprising alkyl dicarboxylic acids having a total of 2 to 16 carbon atoms and aryl dicarboxylic acids having a total of from 8 to 16 carbon atoms. Examples of such alkyl dicarboxylic acids are glutaric acid, azelaic adipic acid, pimelic, suberic, succinic, sebacic, azalic, malonic and the like. Examples of such aryl dicarboxylic acids include the various isomers of phthalic acid, such as terephthalic acid, isophthalic acid. Preferably terephthalic, isophthalic and sebacic are used.

The diols used can be any diol having from 2 to 10 carbon atoms. The diol or glycol may be straight chained or branched. Specific examples include ethylene glycol, propylene glycol, trimethylene, 1,2-butane diol, 1,3-butane diol, 1,4-butane diol, 1,4-butane diol, 2,3-butane diol, neopentyl glycol, hexamethylene glycol and cyclohexane dimethynol. Preferably ethylene glycol and neopentyl glycol are used.

In the esterification reaction the amount of diol should be present such that the total diol-acid is in a mole ratio of from 2.5:1 to 1.15:1. Preferably 2.2:1 to 1.5:1.

The esterification reaction involving reaction between a free dicarboxylic acid and a glycol with the evolution of water also is carried out at elevated temperatures and, in addition, elevated pressures employing inert gas atmospheres. Usually the reaction temperatures will range from 190° to 270° C. and pressures from atmospheric to 40 pounds per square inch. The reaction can be carried out either in the presence or absence of catalysts. When catalysts are employed, those normally indicated in the art as being useful include compounds of metals such as zinc, lead, antimony, manganese, zirconium, tin, titanium and the like. The reaction can also be carried out in the presence of low molecular weight polymeric solvent such as described in U.S. Pat. No. 4,020,049, the teachings of which are incorporated herein by reference.

In the transesterification reaction the esterification product is further reacted with a diol and a diester. The diol can be any previously mentioned. The diester is selected from the group of alkyl diesters having a total of from 2 to 20 carbon atoms and alkyl substituted aryl diesters having a total of from 10 to 20 carbon atoms. Examples of alkyl diesters include dimethyl adiptate, diethyl adipate and the like. Specific examples of the alkyl substituted aryl diesters include the various isomers of dimethyl phthalate, the various isomers of diethyl phthalate, the various isomers of dimethyl naphthalate and the various isomers of diethyl naphthalate. Of the dicarboxylic diesters, preferably the various isomers of dimethyl phthalate, for example dimethyl terephthalate are used.

In general the transesterification reaction, involving reaction between a dialkyl ester of a dicarboxylic acid and glycol, will be conducted at elevated temperatures ranging from 170° C. to 235° C. and preferably from 185° C. to 225° C. under an inert gas atmosphere such as nitrogen.

In the transesterification reaction conventional catalysts can be used to speed up the reaction. Examples of conventional catalysts are soluble lead and titanium compounds including litharge, lead acetate, glycol titanates as well as other well known transesterification catalyst such as compounds of zinc, magnesum, calcium and manganese. In many instances the soluble lead and titanium compounds may be preferred since these catalysts are also known to promote the formation of highly polymeric products in the subsequent polycondensation stage.

The polycondensation reaction, the final preparation step in the production of the copolyesters is carried out employing well known techniques. Thus in the polycondensation step elevated temperatures, reduced pressures and inert atmospheres are utilized during the polymerization of the transesterification reaction product to the desired final product. Temperatures employed in this reaction step will generally range from 240° C. to 300° C. and preferably from 270° C. to 285° C. while pressures will range from about 1.0 to 0.1 millimeters of mercury pressure. Catalysts useful in promoting the polycondensation reaction incude, in addition to the soluble lead and titanium catalysts noted above, various known compounds of antimony, niobium and germanium such as antimony trioxide, niobium pentoxide, germanium dioxide and the like. Normally these catalysts will be added to the transesterification reaction product when the formation of said product is fairly complete and before the polycondensation step is begun. Catalysts useful in promoting the polycondensation reaction include, in addition to the soluble lead and titanium catalysts noted above, various known compounds of antimony, niobium and germanium such as antimony trioxide, niobium pentoxide, germanium dioxide and the like. Normally these catalysts will be added to the transesterification or esterification reaction product when the formation of said product is fairly complete and before the polycondensation step is begun.

In the practice of the present invention various conventional stabilizers can be added to the reaction mixture. Normally the stabilizer is added prior to the polycondensation stage but after the esterification stage. Examples of the conventional stabilizers are phosphorous compounds such as triphenyl phosphate, triphenyl phosphate, triethylene phosphite.

Intrinsic viscosities (I.V.) were determined employing a 60/40 phenol/tetrachloroethane mixed solvent system and measured in a No. 1 Ubbelohde viscosimeter at 30° C. using concentrations of 0.4 gram of sample per 100 cubic centimeter of mixed solvent.

The following examples are supplied in order to illustrate, but not necessarily limit the scope of the present invention.

EXAMPLE 1

To a 3.78 liter capacity stainless steel reactor fitted with a stirrer and distillation column were charged 635.6 grams of ethylene glycol, 631 grams of isophthalic acid and 170.9 grams of sebacic acid. Under a nitrogen blanket at atmospheric pressure the mixture was heated from 155° C. to 210° C. over a period of 4 hours, during which time a total of 160 milliliters of water were distilled off from the mixture.

To the above esterification product which functions as a solvent for the following transesterification reaction was added 740 grams of dimethyl terephthalate, 454 grams of neopentyl glycol, 0.584 grams of the dihydrate of zince acetate (catalyst) and 0.163 grams of triethylene diphosphite (stabilizer). For the next 1½ hours the reaction mixture was stirred, heated to 230° C., and air was introduced during which time 290 milliliters of methyl alcohol were distilled off from the mixture. At this point the reaction mixture was transferred to a 3.78 liter polymerization vessel equipped with a stirrer, distillation column and vacuum line. To the reaction mixture in this polymerization reactor was added 34.6 grams of an ethylene glycol solution containing 210 grams of antimony trioxide per 1000 grams of theoretial resulting copolyester. Over the next 60 minutes, the temperature of the reaction mixture was increased from 225° C. to 227° C. and the pressure decreased from atmospheric to 1.0 millimeter of mercury pressure. The reaction mixture was then heated an additional 30 minutes at 246° and at a pressure of 0.9 millimeters of mercury. Thereafter the reaction mixture was polycondensed by heating an additional 2½ hours at 267° C. to 278° C. and at a pressure of 0.1 to 0.15 millimeters of mercury. At the end of this time the copolyester was discharged and analyzed. See Table I.

EXAMPLES 2-3

A second and third (ethylene glycol-neopentyl glycol/terephthalate acid-isophthalic-sebacic acid) copolyester was produced employing the same equipment, techniques and conditions as employing in Example 1 with the exception that the esterification reaction time, transesterification time and polycondensation time were varied. At the end of the reactions, the two copolyesters were discharged and analyzed. See Table I for results.

TABLE I

| Example | Reaction Time (minutes) | | | IV | COOH | Density g/cc | Bound Ratio |
| | Esterification | Transesterification | Polycondensation | | | | |
| --- | --- | --- | --- | --- | --- | --- | --- |
| 1 | 255 | 185 | 185 | .898 | 13 | 1.256 | 61/39–48/44/8 |
| 2 | 200 | 190 | 160 | .790 | 14 | 1.257 | 59/41–47/45/8 |
| 3 | 160 | 155 | 130 | .766 | 15 | 1.258 | 57/43–46/46/8 |

EXAMPLE 4

To a 3.78 liter capacity stainless steel reactor fitted with a stirrer and distillation column were charged 635.6 grams of ethylene glycol, 631 grams of isophthalic acid and 170.9 grams of sebacic acid. Under a nitrogen blanket at atmospheric pressure the mixture was heated from 155° C. to 210° C. over a period of 2 hours and 15 minutes, during which time a total of 160 milliliters of water were distilled off the mixture.

To the above esterification product which functions as a solvent for the following transesterification reaction was added 740 grams of dimethyl terephthalate, 454 grams of neopentyl glycol, 10.8 grams of an ethylene solution containing 0.06 grams of Ti(TBT) per 1000 grams of theoretical resulting copolyester. For the next 75 minutes the reaction mixture was stirred, heated to a temperature from 210° C. to 228° C. during which time 290 milliliters of methyl alcohol were distilled off the mixture. At this point the reaction mixture was transferred to a 3.78 liter polymerization vessel equipped with a stirrer, distillation column and vacuum line. Over the next 90 minutes, the temperature of the reaction mixture was increased from 223° C. to 246° C. and the pressure decreased from atmosphere to 1.0 millimeters of mercury pressure. The reaction mixture was then heated an additional 70 minutes at a temperature from 246° C. to 261° C. and at a pressure of from 1.0 millimeters to 0.3 millimeters of mercury. At the end of this time the copolyester was discharged and analyzed. See Table II.

EXAMPLES 5-9

Examples 5-9 were produced employing the same equipment, techniques and conditions as employed in Example 4 with the exception that the esterification reaction time, transesterification time and polycondensation time were varied. At the end of the reactions, the five copolyesters were discharged and analyzed. See Table II for results.

TABLE II

| Example | Reaction Time | | | IV | COOH | Density g/cc | Bound Ratio |
|---|---|---|---|---|---|---|---|
| | Esterification | Transesterification | Polycondensation | | | | |
| 4 | 135 | 165 | 70 | .809 | 6 | 11.256 | 59/41-44/44/8 |
| 5 | 165 | 180 | 80 | .802 | 7 | 1.259 | 59/41-46/46/8 |
| 6 | 160 | 155 | 50 | .749 | 7 | 1.260 | 59/41-46/46/8 |
| 7 | 150 | 175 | 45 | .745 | 6 | 1.255 | 58/42-53/42/8 |
| 8 | 185 | 185 | 65 | .710 | 7 | 1.255 | 58/42-50/39/9 |
| 9 | 245 | 175 | 50 min | .572 | 2 | 1.255 | 59/41-50/42/8 |

TABLE III

| Example | Molecular Weight Distribution $\times 10^{-3}$ | | | Peak $\overline{MW}$*4 | Poly Dispersity |
|---|---|---|---|---|---|
| | $\overline{Mn}$*1 | $\overline{Mw}$*2 | $\overline{Mz}$*3 | | |
| 1 | 26 | 84 | 166 | 70 | 3.19 |
| 3 | 24 | 67 | 126 | 55.5 | 2.77 |
| 4 | 26 | 76 | 148 | 62.7 | 2.90 |
| 5 | 27 | 76 | 141 | 62.7 | 2.82 |
| 6 | 25 | 70 | 139 | 55.5 | 2.82 |

$\overline{Mn}$*1 = number average molecular weight which represents the total weight of a sample divided by the total number of moles of which it contains number is defined by the following:

$$\overline{Mn} = \Sigma \frac{M_i N_i}{N_i}$$

wherein $N_i$ is the mole fraction of polymer species and $M_i$ is the molecular weight.
$\overline{Mw}$*2 = is weight average molecular weight. This number is defined by the following:

$$\overline{Mw} = \Sigma \frac{N_i \cdot M_i}{N_i \cdot M_i}$$

where $N_i$ is the mole fraction of polymer species and $M_i$ is the molecular weight:
$\overline{Mz}$*3 = is a molecular weight average defined by the following:

$$\overline{Mz} = \Sigma \frac{N_i(M_i)^3}{N_i(M_i)^2}$$

where $N_i$ is the mole fraction of polymer species and $M_i$ is the molecular weight.
Peak $\overline{MW}$*4 = molecular weight fraction which is the highest concentration in the overall polymer.
Polydisperity - index of hetereogeneity of the molecular weight concentration.

EXAMPLE 10 (CONTROL)

For comparative purposes the following copolyester resins were produced by the conventional transesterification process listed below.

To a 2000 lb. capacity stainless steel reactor fitted with a stirrer and distillation column were charged 8.73 kilograms (45 moles) of DMT, 4.34 kilograms (70 moles) of ethylene glycol and 3.12 kilograms (30 moles) of neopentyl glycol and 76 ppm of zinc (in the form of zinc acetate) based on the theorical weight of the grams of zinc acetate as the transesterification catalyst. This mixture was heated at approximately 212° C. over a period of 3 hours and 12 minutes with constant stirring during which time a total of 2.8 kilograms of methanol were distilled from the reaction. At this point 4.7 kilograms of isophthalic acid (45 moles), 2.04 kilograms (10 moles) of sebacic acid was added with stirring, to the transesterification product. The reaction mixture was heated at a temperature of 256° C. for approximately 3 hours and 19 minutes. The reactants were then transferred to a 2000 lb capacity polycondensation reaction vessel. To the mixture was added the equivalent of 210 ppm of Sb, in the form of antimony glycolate, based on the calculated yield of the copolyester. The reaction mixture was then heated to 277° C. and the pressure in the vessel reduced to 0.1 millimeters of mercury pressure over a period of 1 hour. During the next 47 minutes, the pressure and temperature was maintained. At the end of this time the copolyester was discharged and analyzed for intrinsic viscosity, carboxyl number, density and bound ratio. See Table IV listed below.

EXAMPLES 11-17 (CONTROLS)

Examples 11-17 were produced employing the same equipment techniques and conditions as employed in Example 10 with the exception that the reaction times were varied resulting different intrinsic viscosities. See Table IV below listing the physical data for Examples 11-17.

TABLE IV
(Controls)

| Example | IV | COOH | Density g/cc | Bound Ratio E/N-T/I/S |
|---|---|---|---|---|
| 10 | 803 | 38 | 1.256 | 55/45-47/45/8 |
| 11 | .782 | 35 | 1.251 | 55/45-50/41/9 |
| 12 | .770 | 33 | 1.249 | 52/48-48/44/8 |
| 13 | .761 | 28 | 1.250 | 55/45-45/45/10 |
| 14 | .747 | 28 | 1.250 | 55/45-49/42/9 |
| 15 | .739 | 34 | 1.242 | 52/48-47/44/9 |
| 16 | .697 | 28 | 1.251 | — |
| 17 | .651 | 34 | 1.247 | — |

As one can observe by comparing the density variation of Examples 10-17 (DMT) of 0.014 g/cc and the density variation of Examples 1-9 of 0.005, there is less variation in density with the copolyesters produced by the process of the present invention.

For comparative reasons, two DMT produced resins were contrasted with a resin produced by the present invention (Example 3). The physical properties of the these are below:

| | | Bound Ratio | | | | Peak Mol Wgt. | Density |
|---|---|---|---|---|---|---|---|
| | IV | E/N | T/I/Seb | MW | $M_n$ | $M_z$ | |
| Example 3 | .766 | 57/43 | 46/46/8 | 67 | 24 | 126 | 55.5 | 1.258 |
| Control 1 | .774 | 59/48 | 49/43/8 | 64 | 22 | 113 | 59 | 1.249 |
| Control 2 | .748 | 52/48 | 48/44/8 | 69 | 24 | 125 | 66 | 1.257 |

The above referenced resins were subjected to GPC (gel permeation chromotograph) analysis and FIG. 1 shows the results based on a polystyrene standard.

While certain representative embodiments and details have been shown for the purpose of illustrating the invention it will be apparent to those skilled in this art that various changes and modifications can be made thereto without departing from the spirit and scope of the invention as defined in the appended claims hereinbelow.

We claim:

1. A process to improve randomization of copolyesters comprising;
   (a) esterifying a dicarboxylic acid and a diol, said dicarboxylic acid selected from the group comprising alkyl dicarboxylic acids having a total of 2 to 16 carbons atoms or an aryl dicarbocxylic acid having a total of from 8 to 16 carbon atoms; said diol having from 2 to 10 carbon atoms, said diol is in a mole ratio to dicarboxylic acid from 2.5:1 to 1.15:1; thereafter,
   (b) transesterifying the esterification product in the presence of a diol and a diester, said diol having from 2 to 10 carbon atoms, said diester being selected from the group of alkyl diesters having a total of from 2 to 20 carbon atoms, and alkyl substituted aryl diesters having a total of from 10 to 20 carbon atoms; thereafter
   (c) polymerizing the transesterification product in a condensation stage to form a polycondensed copolyester having an intrinsic viscosity from 0.2 to 0.9.

2. A process of claim 1 wherein said esterification reaction is characterized by said dicarboxylic acid being isophthalic and sebacic, said diol being ethylene glycol, wherein said transesterification reaction is characterized by said diester being dimethyl terephthalate and said diol is neopentyl glycol.

3. A process of claim 1 wherein mole ratio of said diol and said dicarboxylic acid is 2.2:1 to 1.5:1.

4. A process to improve randomization of copolyesters comprising;
   (a) esterifying a dicarboxylic acid and a diol, said dicarboxylic acid selected from the group comprising alkyl dicarboxylic acids having a total of 2 to 16 carbon atoms or an aryl dicarboxylic acid having a total of from 8 to 16 carbon atoms; said diol having from 2 to 10 carbon atoms, said diol is in a mole ratio to dicarboxylic acid from 2.5:1 to 1.15:1; wherein the esterification is conducted at a temperature of from 190° C. to 270° C. and pressures from atmospheric to 40 pounds per square inch and under an inert atmosphere thereafter;
   (b) transesterifying the esterification product in the presence of a diol and a diester, said diol having from 2 to 10 carbon atoms, said diester being selected from the group of alkyl diesters having a total of from 2 to 20 carbon atoms, and alkyl substituted aryl diesters having a total of from 10 to 20 carbon atoms; wherein the transesterification is conducted at a temperature of from 170° C. to 235° C. and under an inert atmosphere, thereafter;
   (c) polycondensing the transesterification product to form a polycondensed copolyester having an intrinsic viscosity from 0.2 to 0.9, wherein said polycondensation is conducted at a temperature of from 240° C. to 300° C. at a pressure of from 1.0 to 0.1 millimeters of mercury pressure.

5. A process of claim 4 wherein said esterification there is added a catalyst selected from the group of compounds of zinc, lead, antimony, manganese, zirconium, tin and titanium.

6. A process of claim 4 wherein said tranesterification there is added a catalyst selected from the group of soluble lead and titanium compounds.

7. A process of claim 4 wherein said polycondensation there is added a catalyst selected from the group of soluble lead compounds, soluble titanium compounds, antimony compounds, niobium compounds and germanium compounds.

* * * * *